(12) United States Patent
Kim et al.

(10) Patent No.: US 12,417,761 B2
(45) Date of Patent: Sep. 16, 2025

(54) DUMMY PROTOTYPICAL NETWORKS FOR FEW-SHOT OPEN-SET KEYWORD SPOTTING

(71) Applicant: QUALCOMM Incorporated, San Diego, CA (US)

(72) Inventors: Byeonggeun Kim, Seoul (KR); Seunghan Yang, Incheon (KR); Inseop Chung, Seoul (KR); Simyung Chang, Suwon (KR)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 18/062,976

(22) Filed: Dec. 7, 2022

(65) Prior Publication Data

US 2023/0298572 A1 Sep. 21, 2023

Related U.S. Application Data

(60) Provisional application No. 63/321,677, filed on Mar. 19, 2022.

(51) Int. Cl.
*G10L 15/16* (2006.01)
*G06F 18/22* (2023.01)
(Continued)

(52) U.S. Cl.
CPC ............. *G10L 15/16* (2013.01); *G06F 18/22* (2023.01); *G10L 2015/088* (2013.01)

(58) Field of Classification Search
CPC ....... G10L 15/16; G10L 15/10; G10L 15/063; G10L 15/08; G10L 15/06; G10L 15/02;
(Continued)

(56) References Cited

U.S. PATENT DOCUMENTS 5,440,662 A 8/1995 Sukkar
2008/0195387 A1 8/2008 Zigel et al.

OTHER PUBLICATIONS

Jeong et al., "Few-shot Open-set Recognition by Transformation Consistency", 2021 IEEE/CVF Conference on Computer Vision and Pattern Recognition CVPR, pp. 12561-12570 (Year: 2021).*
(Continued)

*Primary Examiner* — Leshui Zhang
(74) *Attorney, Agent, or Firm* — Polsinelli LLP

(57) ABSTRACT

Systems and techniques are provided for processing audio data. For example, a dummy prototypical network may be used to perform few-shot open-set keyword spotting (FSOS-KWS). A process can include determining one or more prototype representations based on a plurality of support samples associated with one or more classes. Each prototype representation may be associated with one of the class(es). A dummy prototype representation can be determined in a same learned metric space as the prototype representations. One or more distance metrics can be determined for each query sample of one or more query samples. The distance metrics may be based on the prototype representations and the dummy prototype representation. Each query sample can be classified based on the distance metrics. Each query sample may be classified into one of the class(es) associated with the prototype representations or into an open-set class associated with the dummy prototype representation.

30 Claims, 7 Drawing Sheets

(51) Int. Cl.
  *G06V 10/82*  (2022.01)
  *G10L 15/06*  (2013.01)
  *G10L 15/08*  (2006.01)
  *G10L 25/78*  (2013.01)

(58) Field of Classification Search
  CPC ..... G10L 15/22; G10L 15/1815; G10L 15/26; G10L 2015/088; G10L 2015/0631; G10L 25/78; G10L 2015/0635; G10L 25/30; G10L 13/08; G10L 13/047; G10L 17/04; G10L 17/06; G10L 17/18; G10L 25/51; G06F 16/3329; G06F 16/90332; G06F 16/35; G06F 16/3346; G06F 18/22; G06F 40/30; G06F 40/35; G06F 40/284; G06F 40/216; G06V 20/20; G06V 10/82; G06N 3/08; G06N 3/045; G06N 3/084; G06N 3/044; G06N 3/048; G06N 3/047; G06N 3/088; G06N 3/0464; G06N 20/00; G06N 3/09; G06N 3/0475; G06N 3/096; G06N 20/10; G06N 3/0895; G06N 5/04
  USPC ....... 704/232, 235, 238, 239, 240, 245, 200, 704/202, 203, 1–9; 706/12, 13, 15, 16, 706/17, 18, 20, 25, 41, 42, 46, 47
  See application file for complete search history.

(56) References Cited

OTHER PUBLICATIONS

Garg et al. "Speech Based Emotion Recognition Based on Hierarchical Decision Tree with SVM, BLG, and SVR Classifiers", IEEE Xplore, 2013 National Conference on Communications NCC, February 15-17, pp. 5 (Year: 2013).*

Parnami et al. "Few-Shot Keyword Spotting with Prototypical Networks", Arxiv.org, Cornell Univ. Lib., 201 Online Lib. Cornell Univ. Ithaca, NY 14853, Jul. 25, pp. 6 (Year: 2021).*

International Search Report and Written Opinion—PCT/US2023/060938—ISA/EPO—Mar. 17, 2023.

Jeong M., et al., "Few-shot Open-set Recognition by Transformation Consistency", IEEE/CVF Conference on Computer Vision and Pattern Recognition (CVPR), IEEE, Jun. 20, 2021, pp. 12561-12570, XP034009469, Abstract paragraph bridging the columns, p. 12562, Sections 2.3, 3.2, 3.3, 4.2, "Algorithm 1", p. 12564, Figures 1, 3, DOI: 10.1109/CVPR46437.2021.01238.

Kim B., et al., "Dummy Prototypical Networks for Few-Shot Open-Set Keyword Spotting", Interspeech 2022, Sep. 18-22, 2022, Incheon, Korea, Arxiv.org, Cornell University Library, 201 Olin Library Cornell University Ithaca, NY, 14853, Jun. 28, 2022, pp. 4621-4625, XP091258309, Sections 1, 3, Figures 1, 2.

Knill K.M., et al., "Low-cost Implementation of Open Set Keyword Spotting", Computer Speech and Language, Elsevier, London, GB, vol. 13, No. 3, Jul. 1, 1999, pp. 243-266, XP004418757, ISSN: 0885-2308, DOI: 10.1006/CSLA. 1999.0122, Abstract, Sections 4.3.1, 4.3.2, Figure 1.

Liu B., et al., "Few-Shot Open-Set Recognition Using Meta-Learning", IEEE/CVF Conference on Computer Vision and Pattern Recognition (Cvpr), IEEE, Jun. 13, 2020, pp. 8795-8804, XP033804790, DOI: 10.1109/CVPR42600.2020.00882, Abstract, Sections 3.1, 4, Figure 2.

Mazumder M., et al., "Few-Shot Keyword Spotting in Any Language", Arxiv.org, Cornell University Library, 201 Olin Library Cornell University Ithaca, NY 14853, Sep. 9, 2021, 5 Pages, XP091047820, DOI: 10.21437/INTERSPEECH.2021-1966, Abstract, Introduction, Sections 3.2, 4.1, Figure 1.

Pal D., et al., "Few-Shot Open-Set Recognition of Hyperspectral Images with Outlier Calibration Network", IEEE/CVF Winter Conference on Applications of Computer Vision (WACV), IEEE, Jan. 3, 2022, pp. 2091-2100, XP034086129, DOI: 10.1109/WACV51458. 2022.00215 Abstract, p. 2092, left-hand column, line 8—right-hand column, line 24 paragraph "Outlier Calibration Network"; p. 2095, Section 3.4, Figure 2.

Parnami A., et al., "Few-Shot Keyword Spotting With Prototypical Networks", Arxiv.org, Cornell University Library, 201 Olin Library Cornell University Ithaca, NY 14853, Jul. 25, 2020, 6 Pages, XP091244533, DOI: 10.1145/3529399.3529443 Abstract, Sections 3, 4, Figure 1.

Sukkar R.A., et al., "A Two Pass Classifier for Utterance Rejection in Keyword Spotting", Proceedings of IEEE International Conference on Acoustics, Speech, and Signal Processing, Orlando, FL, May 13-17, 2002, New York, NY, IEEE, US, Apr. 27, 1993, pp. 451-454, vol. 2, XP031984188, DOI: 10.1109/ICASSP.1993. 319338, ISBN: 978-0-7803-7402-7, Section 3.1.

* cited by examiner

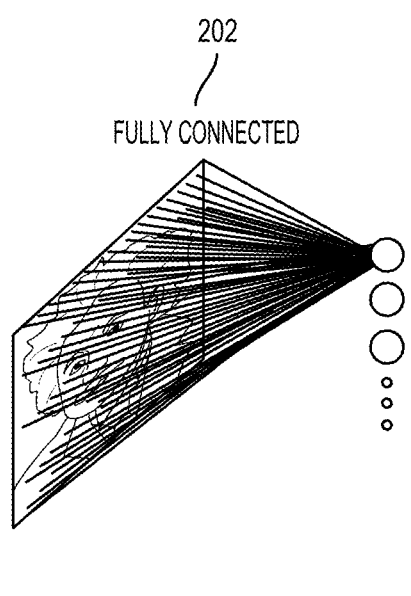 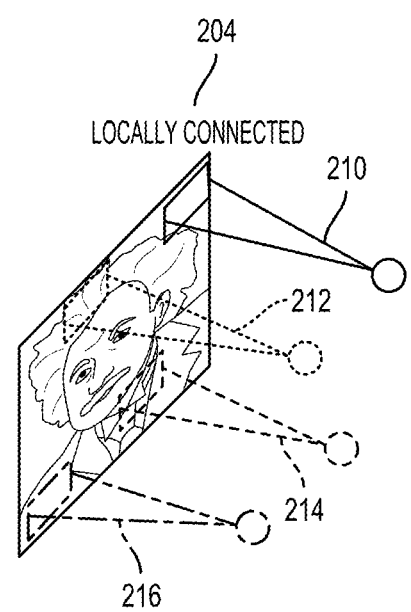
FIG. 2A  FIG. 2B

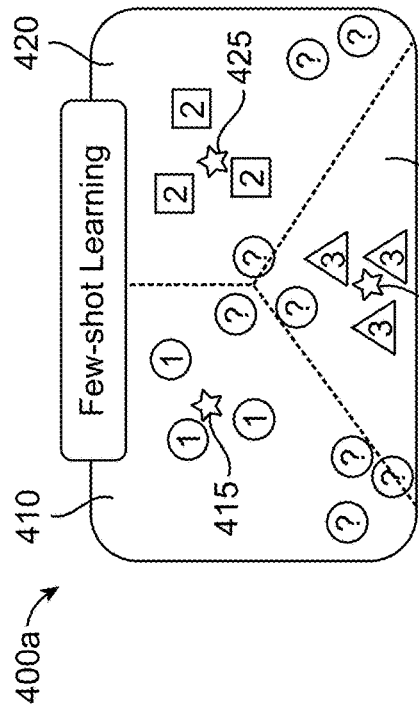
FIG. 4A
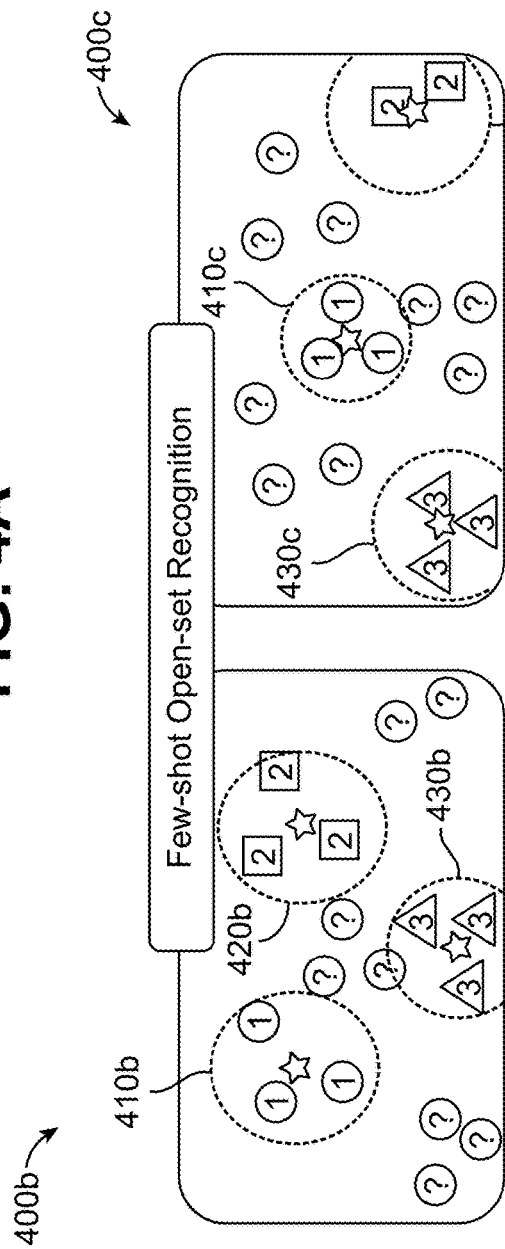
FIG. 4B
FIG. 4C

DUMMY PROTOTYPICAL NETWORKS FOR FEW-SHOT OPEN-SET KEYWORD SPOTTING

CROSS-REFERENCE TO RELATED APPLICATIONS

This application claims the benefit of U.S. Provisional Application No. 63/321,677, filed Mar. 19, 2022, which is hereby incorporated by reference, in its entirety and for all purposes.

FIELD

The present disclosure generally relates to audio signal processing. For example, aspects of the present disclosure are related to systems and techniques for performing open-set recognition (OSR) keyword spotting (KWS) using one or more machine learning systems (e.g., including one or more neural network-based models).

BACKGROUND

Electronic devices such as smartphones, tablet computers, wearable electronic devices, smart TVs, and the like are becoming increasingly popular among consumers. These devices can provide voice and/or data communication functionalities over wireless or wired networks. In addition, such electronic devices can include other features that provide a variety of functions designed to enhance user convenience. Electronic devices can include a speech recognition function for receiving voice commands from a user. Such a function allows an electronic device to perform a function associated with a voice command (e.g., a keyword) when the voice command from a user is received and recognized. For example, the electronic device may activate a voice assistant application, play an audio file, or take a picture in response to the voice command from the user.

In electronic devices having a speech recognition feature, manufacturers or carriers can often equip the devices with predetermined keywords and associated sound models, which may be used in detecting the keywords in an input sound. Some electronic devices may also allow a user to designate a keyword as a voice command. For example, electronic devices may receive several utterances of a keyword from a user and generate a keyword model for the designated keyword from the utterances. The detection performance of a keyword model can be related to the number of utterances from which the keyword model is generated. The detection performance of a keyword model may improve as the number of utterances increases. For example, a manufacturer may provide a keyword model in an electronic device that has been generated from thousands of utterances or more.

In some electronic devices, however, the number of utterances of a keyword received from a user is relatively small (e.g., less than five). Thus, the keyword model generated from such limited number of utterances may not produce adequate detection performance. However, receiving a substantial number of utterances from a user to generate a keyword model that can provide sufficient detection performance may be time consuming and inconvenient to the user.

SUMMARY

In some examples, systems and techniques are described for few-shot open-set recognition (FSOSR). In some examples, the systems and techniques can be used to perform keyword spotting with recognition and rejection of open-set queries not belonging to a known or seen class. In some aspects, the systems and techniques can utilize a dummy prototypical network to perform few-shot open-set keyword spotting (FSOS-KWS).

According to at least one example, a method is provided for processing one or more data samples, the method including: determining one or more prototype representations based on a plurality of support samples associated with one or more classes, wherein each prototype representation is associated with one of the one or more classes; determining a dummy prototype representation, wherein the one or more prototype representations and the dummy prototype representation are determined in a same learned metric space; determining one or more distance metrics for each query sample of one or more query samples, wherein the one or more distance metrics are determined based on the one or more prototype representations and the dummy prototype representation; and classifying each query sample based on the one or more distance metrics, wherein each query sample is classified into one of the one or more classes associated with the one or more prototype representations or an open-set class associated with the dummy prototype representation.

In another example, an apparatus for processing one or more data samples is provided that includes a memory (e.g., configured to store data, such as audio data, etc.) and one or more processors (e.g., implemented in circuitry) coupled to the memory. The one or more processors are configured to and can: determine one or more prototype representations based on a plurality of support samples associated with one or more classes, wherein each prototype representation is associated with one of the one or more classes; determine a dummy prototype representation, wherein the one or more prototype representations and the dummy prototype representation are determined in a same learned metric space; determine one or more distance metrics for each query sample of one or more query samples, wherein the one or more distance metrics are determined based on the one or more prototype representations and the dummy prototype representation; and classify each query sample based on the one or more distance metrics, wherein each query sample is classified into one of the one or more classes associated with the one or more prototype representations or an open-set class associated with the dummy prototype representation.

In another example, a non-transitory computer-readable medium is provided that has stored thereon instructions that, when executed by one or more processors, cause the one or more processors to: determine one or more prototype representations based on a plurality of support samples associated with one or more classes, wherein each prototype representation is associated with one of the one or more classes; determine a dummy prototype representation, wherein the one or more prototype representations and the dummy prototype representation are determined in a same learned metric space; determine one or more distance metrics for each query sample of one or more query samples, wherein the one or more distance metrics are determined based on the one or more prototype representations and the dummy prototype representation; and classify each query sample based on the one or more distance metrics, wherein each query sample is classified into one of the one or more classes associated with the one or more prototype representations or an open-set class associated with the dummy prototype representation.

In another example, an apparatus for processing one or more data samples is provided. The apparatus includes: means for determining one or more prototype representations based on a plurality of support samples associated with one or more classes, wherein each prototype representation is associated with one of the one or more classes; determining a dummy prototype representation, wherein the one or more prototype representations and the dummy prototype representation are determined in a same learned metric space; determining one or more distance metrics for each query sample of one or more query samples, wherein the one or more distance metrics are determined based on the one or more prototype representations and the dummy prototype representation; and classifying each query sample based on the one or more distance metrics, wherein each query sample is classified into one of the one or more classes associated with the one or more prototype representations or an open-set class associated with the dummy prototype representation.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other objects and advantages associated with the aspects disclosed herein, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

FIG. 2A and FIG. 2B illustrate an example of a fully connected neural network, in accordance with some examples;

FIG. 4A is a diagram illustrating another example of a few-shot learning (FSL) scenario, in accordance with some examples;

FIG. 4B is a diagram illustrating a first example episode of a few-shot open-set recognition (FSOSR) episode, in accordance with some examples;

FIG. 4C is a diagram illustrating a second example episode of a few-shot open-set recognition (FSOSR) episode, in accordance with some examples;

DETAILED DESCRIPTION

Figure 1:
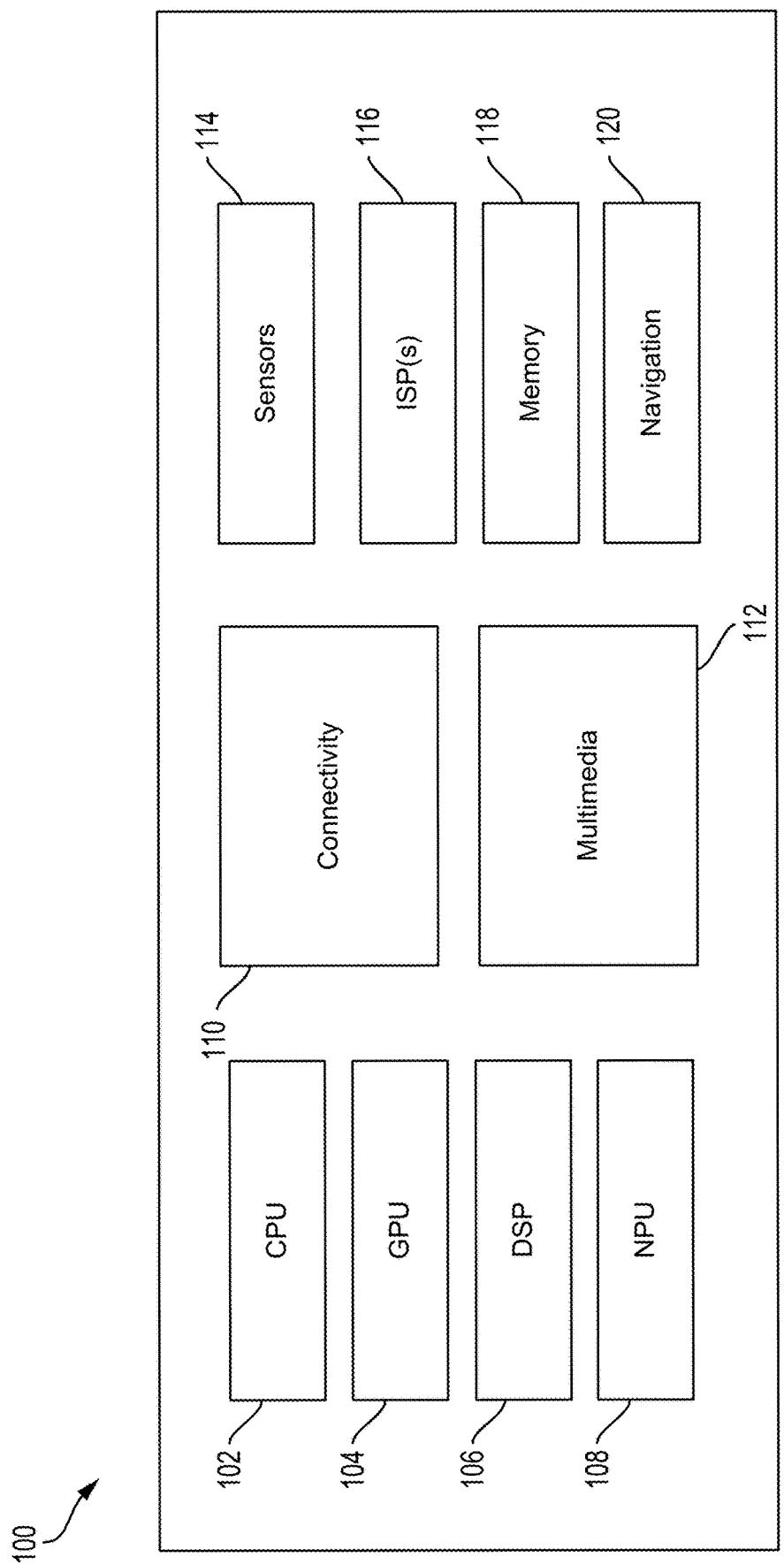
FIG. 1 illustrates an example implementation of a System-on-a-Chip (SoC), in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples may be practiced without these specific details. The figures and description are not intended to be restrictive.

The ensuing description provides example aspects, and is not intended to limit the scope, applicability, or configuration of the disclosure. Rather, the ensuing description of the exemplary aspects will provide those skilled in the art with an enabling description for implementing examples and aspects of the disclosure. It should be understood that various changes may be made in the function and arrangement of elements without departing from the spirit and scope of the application as set forth in the appended claims.

Voice activity detection can refer to the detection of a human voice by a computing device in order to perform some function. For example, a computing device can use voice activity detection, such as by the recognition of specific keywords, to wake or activate a device, to query a device, and/or to cause the device to perform various other functions. Voice activity detection can also be used in more complex functionalities, such as far-field voice detection (e.g., from a mobile device placed across a room), user identify verification (e.g., by voice signature), voice detection during other audio output (e.g., detecting a voice command while playing back music on a device or detecting an interrupting command while a smart assistant is speaking), and/or voice interaction in complex noise environments, such as within moving vehicles.

Keyword spotting (KWS) is a task of detecting one or more keywords in an audio signal (e.g., an audio signal including human speech or spoken words). For example, KWS can be used to distinguish an activation phrase or a specific command from other speech and noise in an audio signal. In some cases, KWS systems can target or be utilized by edge devices such as mobile phones and smart speakers. Detected keywords can include single words, compound words, phrases including multiple words, etc. In some cases, KWS can be performed based on a set of pre-determined keywords and/or a set of user-defined keywords. In some cases, user-defined keywords can include one or more adaptations, adjustments, etc., that are determined based on specific characteristics of a given user's voice or speech.

The audio signal can be a streaming audio signal and, in some examples, KWS can be performed for the streaming audio signal in real-time. A streaming audio signal can be recorded by or obtained from a microphone associated with a computing device. KWS can be performed locally or remotely. For example, KWS can be performed locally using one or more processors of the same computing device that collects or obtains the streaming audio signal. In some examples, KWS can be performed remotely by transmitting the streaming audio signal (or a representation thereof) from the local computing device to a remote computing device (e.g., the local computing device records an audio signal but offloads KWS processing tasks to a remote computing device). Performing KWS locally can result in a lower total latency or compute time but a decreased accuracy. Performing KWS remotely can result in a higher latency but an increased accuracy.

For example, local computing devices (e.g., smartphones) often have less computational power than remote computing devices (e.g., cloud computing systems) and therefore may generate KWS results with a lower accuracy or overall performance, particularly when subject to the time constraint associated with providing KWS results in real-time or near real-time. For example, local computing devices might implement KWS detection models with lower complexity than those implemented on remote computing devices in order to provide real-time KWS results. Lower accuracy KWS results can include false positives (e.g., identifying a keyword that is not actually present), false negatives (e.g., failing to identify a keyword that is present), and classification errors (e.g., identifying a first keyword as some other keyword).

However, performing KWS remotely can introduce a communication latency that may offset the accuracy gains associated with remote KWS. For example, remote KWS can introduce latency along the communication path from the local computing device to the remote computing device (e.g., the time to transmit the streaming audio signal or a representation thereof to the remote computing device) and along the return communication path from the remote computing device to the local computing device (e.g., the time to transmit the KWS results from the remote computing device back to the local computing device).

As mentioned above, in some examples, KWS is often performed in real-time (or approximately real-time) to allow user interaction with one or more computing devices. The lag between the time a user speaks a keyword (e.g., an activation phrase or specific command) and the time that the computing device provides a corresponding response or action can be an important factor in the user's willingness to utilize spoken commands. In some cases, a lag of multiple seconds may frustrate users or otherwise dissuade them from using spoken commands. As such, there is a need for improved KWS performance in local and/or remote KWS implementations, as both local and remote KWS implementations are often time-bound processes.

In some approaches to KWS, one or more machine learning networks are used to detect keywords in an audio signal based on a set of pre-defined keyword classifications. For example, KWS can be performed using one or more neural networks trained over the set of pre-defined keyword classifications. The resulting neural network(s) can achieve accurate performance when evaluated against a closed set of keywords that were seen in training, but are often limited to detecting only those keywords that were seen in training (e.g., keywords that correspond to a keyword classification in the training data set).

In some cases, few-shot KWS can be used to detect or classify keywords that were not originally seen in training. In an example FSL-based approach to KWS, a neural network classifier is trained on a training set that includes labeled samples representing various pre-defined classes or categories of keywords. During training, the neural network classifier absorbs knowledge from the labeled samples of the training set. For example, the neural network classifier can learn embeddings or an embedding space for relating the training samples to their corresponding labels. The trained neural network classifier can subsequently adapt or generalize (e.g., at inference) to evaluation tasks of new classes not seen in the training set (e.g., unseen classes).

For example, given only a small number of support examples for each new class, the FSL-based neural network classifier can use an attention mechanism over a learned embedding of the labeled set of support examples (e.g., the support set) to predict classes for unlabeled points (e.g., a query set). In a process of query-by-example, a trained FSL-based neural network classifier can receive a support set that includes M support examples for each of N unseen classes, and a query set that includes one or more query samples. The neural network classifier can determine a prototype representation for each unseen class N (e.g., using the M support examples associated with each unseen class N). Each unlabeled query sample can be classified into one of the previously unseen classes N based on a computed distance between the query sample and each prototype representation. In some cases, this inference process can be referred to as an N-way M-shot episode, where the goal of the FSL-based neural network classifier is to correctly classify a query set into N classes that are unseen during training but known using the M support samples.

In real-world scenarios in which KWS may be utilized, an input audio signal may naturally include utterances, words, phrases, etc., of unexpected novel classes whose support examples are not given. An unexpected novel class can be a class for which no support examples were included in the initial training set or the support set. These unexpected samples and/or classes can be referred to as an "open-set" (e.g., in contrast to the closed set of classes from the initial training set and the support set).

Neural network classifiers may exhibit over-confidence and incorrectly classify an unseen open-set sample into one of the FSL classes. In some examples, the accuracy and/or performance of a KWS system can be improved by rejecting open-set utterances rather than classifying them into one of the pre-determined keyword classifications (e.g., of the closed set). For example, Open-Set Recognition (OSR) can be used to detect unseen open-set classes and subsequently handle and/or reject query samples belonging to the detected open-set class.

Systems, apparatuses, processes (also referred to as methods), and computer-readable media (collectively referred to as "systems and techniques") are described herein for performing few-shot open-set recognition (FSOSR) and/or few-shot open-set keyword spotting (FSOS-KWS) using a machine learning classifier. In some examples, the machine learning classifier can be a neural network classifier. The few-shot neural network classifier can be used to perform improved keyword spotting (KWS) with OSR by predicting episode-specific (e.g., episode-known) dummy classes based on the support examples in each episode. In some examples, the few-shot neural network classifier can classify the predicted dummy classes as an open-set for rejection from a downstream or subsequent KWS process, as will be described in greater depth below. In some aspects, the neural network(s) described herein can be referred to and/or included in a dummy prototypical network (D-ProtoNet).

In some examples, the systems and techniques can generate a set of prototype representations based on a support set provided as input during inference. The support set can include a plurality of support examples associated with known keyword classes. For example, the support set can include example utterances that are labeled with a corresponding keyword class for the utterance. A machine learning encoder can generate embedded support examples from the plurality of support examples included in the support set. The machine learning encoder can be a neural network encoder. In some examples, the embedded support examples for each known class (e.g., each class seen in the labeled support set) can be used to generate or otherwise determine a prototype representation for each class. In some cases, the prototype representation can be determined as the mean of the embedded support examples for each class.

In some examples, the machine learning (e.g., neural network) encoder can also receive as input a query set, wherein the query set includes a combination of query samples that belong to a known class and query samples that belong to an unknown class. The neural network encoder can generate embeddings for the query samples (e.g., can generate embedded query samples), which can then be analyzed against the prototype representations in order to perform classification.

In some examples, one or more dummy prototypes (e.g., dummy prototype representations) can be generated based on the set of prototype representations for each of the known classes. The dummy prototype can be used to classify open-set query samples as not belonging to any of the known classes. For example, the open-set query samples can be rejected or removed as outliers. In some examples, the dummy prototypes can be used to perform few-shot open-set keyword spotting (FSOS-KWS), as will be described in greater depth below.

An illustrative example of a dummy protocol network for few-shot open-set keyword spotting is described in Appendix A appended hereto.

Various aspects of the present disclosure will be described with respect to the figures.

FIG. 1 illustrates an example implementation of a system-on-a-chip (SoC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures, speech, and/or other interactive user action(s) or input(s). In one implementation, the NPU is implemented in the CPU 102, DSP 106, and/or GPU 104. The SoC 100 may also include a sensor processor 114, image signal processors (ISPs) 116, and/or navigation module 120, which may include a global positioning system. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

In some examples, the one or more sensors can include one or more microphones for receiving sound (e.g., an audio input), including sound or audio inputs that can be used to perform keyword spotting (KWS) as described herein. In some cases, the sound or audio input received by the one or more microphones (and/or other sensors) may be digitized into data packets for analysis and/or transmission. The audio input may include ambient sounds in the vicinity of a computing device associated with the SoC 100 and/or may include speech from a user of the computing device associated with the SoC 100. In some cases, a computing device associated with the SoC 100 can additionally, or alternatively, be communicatively coupled to one or more peripheral devices (not shown) and/or configured to communicate with one or more remote computing devices or external resources, for example using a wireless transceiver and a communication network, such as a cellular communication network.

The SoC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SoC 100 and/or components thereof may be configured to perform audio signal processing using one or more machine learning networks and/or machine learning techniques according to aspects of the present disclosure and as described herein. For example, SoC 100 and/or components thereof may be configured to perform keyword spotting according to aspects of the present disclosure. In some examples, by using one or more neural network classifiers to perform few-shot learning (FSL) and/or open-set recognition (OSR), aspects of the present disclosure can increase the accuracy and/or efficiency of keyword spotting (KWS).

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as speech analysis, audio signal analysis, image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

Figure 3:
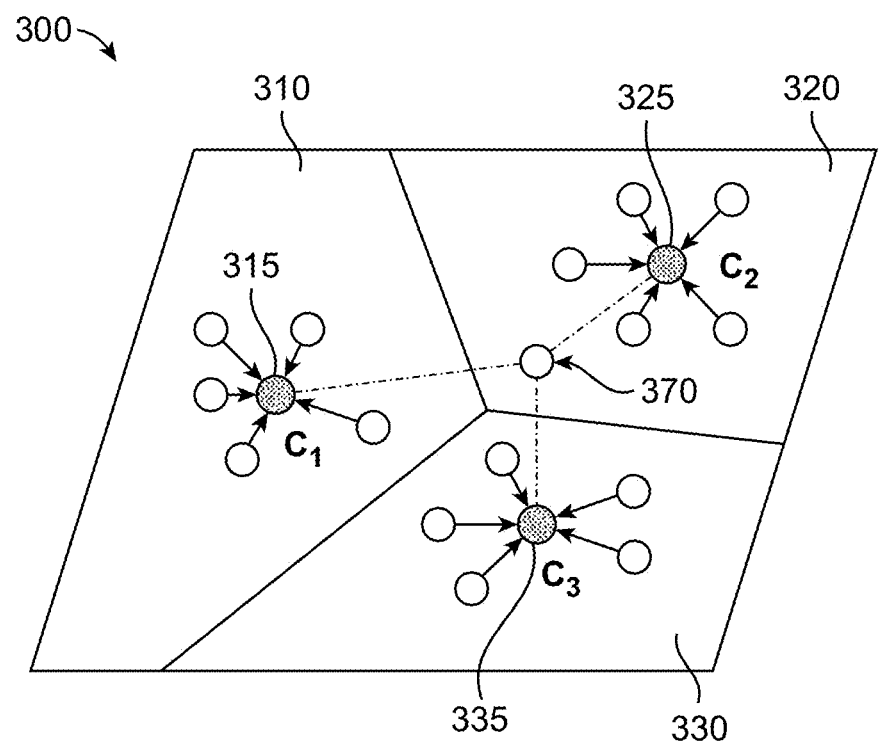
FIG. 3 is a diagram illustrating an example of a few-shot learning (FSL) scenario, in accordance with some examples.

FIG. 3 is a diagram illustrating an example of a few-shot learning (FSL) scenario 300. In some examples, FSL and FSL-based approaches can be used to perform few-shot classification, wherein a classifier (e.g., a neural network or other machine learning classifier) can generalize and extend inference to include new classes not seen in the training set, given only a small number of examples of each new class. For example, FSL-based neural network classifiers can be used to perform few-shot KWS for detecting keywords in an audio stream or audio data, as described previously.

As illustrated, FIG. 3 depicts an example of a 3-way 5-shot FSL scenario, in which a neural network classifier (not shown) receives as input a support set that includes a total of 15 labeled support examples, divided into three previously unseen classes (e.g., 310, 320, and 330) having five support examples each. In one illustrative example, the 3-way 5-shot FSL scenario 300 can be associated with a prototypical network, which learns a metric space in which classification can be performed by computing distances to prototype representations of each class.

The use of prototypical networks for FSL can be based on the idea that there exists an embedding in which points cluster around a single prototype representation for each class. As illustrated in FIG. 3, the five support examples included in class 310 can be seen to cluster around prototype representation 315; the five support examples included in class 320 can be seen to cluster around prototype representation 325; the five support examples included in class 330 can be seen to cluster around prototype representation 335; etc. A prototypical network can include one or more neural networks that learn (e.g., during training) a non-linear mapping of the input into an embedding space. Using the learned embedding space, the prototypical network can take each previously unseen class's prototype to be the mean of its support set in the embedding space. For example, the prototype representation 315 can be determined as the mean of the five embedded support examples for class 310; the prototype representation 325 can be determined as the mean of the five embedded support examples for class 320; the prototype representation 335 can be determined as the mean for the five embedded support examples for class 330; etc.

Classification can then be performed for an embedded query point by determining the nearest class prototype to the query point. For example, the embedded query point 370 can be classified into class 320 based on a determination that the distance from embedded query point 370 to prototype representation 325 is smaller than the distance from embedded query point 370 to either of the remaining prototype representations 315 and 335. In some examples, embedded query points (e.g., embedded query point 370) can be classified based on the Euclidean distance between the embedded query point and each of the prototype representations, although it is noted that various other distance metrics and/or determinations may also be utilized without departing from the scope of the present disclosure.

FIG. 4A is a diagram illustrating another example of an FSL scenario 400a using the prototypical networks (ProtoNets) described above with respect to FIG. 3. As mentioned previously, in an N-way M-shot episode (e.g., one round of inference for a support set containing N*M support examples), FSL can be performed with a goal of correctly classifying one or more queries of a query set into N classes that are unseen during training but known on the basis of receiving M support samples for each previously unseen class. In some examples, a pure FSL-based approach does not consider open-set classes out of the N classes, meaning that a pure FSL-based approach such as that of FSL scenario 400a will only classify the queries into one of the N closed-set classes.

In one illustrative example, FSL scenario 400a is a 3-way 5-shot FSL scenario, meaning that classification is performed over the three classes 410, 420 and 430 in an evaluation (e.g., inference) setting and that the respective prototype representations 415, 425 and 435 are generated using five embedded support examples for each of the three classes. In the context of FSL-based KWS, the three classes 410, 420 and 430 can each represent a keyword or keyword classification. For example, class 410 can represent the keyword "one", class 420 can represent the keyword "two" and class 430 can represent the keyword "three." Because FSL scenario 400a is a 3-way 5-shot FSL scenario, the support set S (not shown) can include a total of 15 support examples (e.g., five example utterances of "one" labeled with the keyword classification 410, five example utterances of "two" labeled with the keyword classification 420, and five example utterances of "three" labeled with the keyword classification 430).

As illustrated in FIG. 4A, a query set Q of test utterances can include a combination of closed-set queries and open-set queries. Closed-set queries can represent test utterances from a known class (e.g., test utterances of "one," two," or "three," corresponding to the support set classes 410, 420, 430, respectively). As illustrated in FIG. 4A, the query set includes three closed-set test utterances for each class 410, 420, 430. Open-set queries can represent test utterances from an unknown class and are depicted in as open circles containing a "?" inside. For example, the open-set queries can include test utterances such as "four," "five," "six," etc., although it is noted that the open-set queries/test utterances can take various other forms with varying degrees of similarity to the closed-set test utterances (e.g., because the open-set can be defined as including any test utterance that does not match a known class). The test utterances of the open-set queries can be associated with one or more unseen and unsupported classes that were not seen in either an initial training data set (e.g., used to initially train a neural network classifier associated with FSL scenario 400a) or in the support set S (e.g., provided to the neural network classifier at inference and used to perform FSL).

Because the open-set classes are unseen, unknown, or otherwise unsupported by the neural network classifier associated with FSL scenario 400a, each of the open-set queries will be incorrectly classified into one of the three known (e.g., closed-set) classes 410, 420, 430. For example, the decision boundaries depicted in FIG. 4A as dotted lines partitioning the embedding space can represent the (erroneous) closed-set classifications that may be determined for the open-set queries. In some examples, the erroneous classification of queries from open-set classes can occur due the design of existing FSL approaches (e.g., such as FSL scenario 400a), which are limited to only the known, closed-set classes and cannot consider any open-set classes regardless of the distance between an open-set query and the nearest prototype representation determined for one of the closed-set classes.

In some real-world scenarios and/or KWS implementations, unseen and unsupported classes such as "four," "five," and "six" may be regularly encountered and are consistently misjudged by existing FSL approaches as belonging to a known or seen class from the closed-set of FSL classes that were seen in training or included in the support set S. There is a need to handle or reject any unseen and unsupported classes during KWS classification, such that novel open-set classes are not incorrectly classified into a seen closed-set class.

FIG. 4B illustrates a first example episode 400b of a few-shot open-set recognition (FSOSR) approach according to one or more aspects of the present disclosure. FIG. 4C illustrates a second example episode 400c of an FSOSR approach according to one or more aspects of the present disclosure. In one illustrative example, the first FSOSR episode 400b and the second FSOSR episode 400c can represent or be applied to the same underlying sample set S and query set Q as was described above with respect to the example FSL scenario 400a illustrated in FIG. 4A.

The systems and techniques described herein can perform FSOSR, including FSOSR for KWS (e.g., FSOS-KWS) to distinguish an unknown open-set from the known closed-set classes, while still performing FSL. For example, the systems and techniques can receive as input a query set including a combination of closed-set test utterances (e.g., which should be correctly classified as belonging to one of the known classes) and open-set test utterances (e.g., which belong to one or more unknown classes, and should not be classified as belonging to any of the known classes). As will be described in greater depth below, the systems and techniques can perform FSOSR and/or FSOS-KWS using episode-known dummy prototypes based on metric learning to detect and reject an open-set. In some examples, episode-specific (e.g., episode-known) dummy classes are predicted based on the support examples included in the support set provided for each episode, and the open-set is classified as the dummy classes and rejected from inclusion in subsequent KWS.

In one illustrative example, the open-set of test utterances having an unknown or unseen class can change over episodes, based on the choice of N classes in the support set S provided as an inference input to each episode. For example, FIG. 4B illustrates a first episode 400b having a first open-set of queries with an unseen class and FIG. 4C illustrates a second episode 400c having a second open-set of queries with an unseen class. The first episode 400b and the second episode 400c are built over the same underlying query set (e.g., the same embedded sample points are depicted in FIGS. 4B and 4C). Based on the choice of N classes that are identified or included in the support set provided for each of the episodes 400b and 400c, the composition of the open-set changes from episode 400b to 400c. The composition of the closed-set classifications also changes from episode 400b to 400c. For example, the first classification 410b includes a different set of queries/test utterances than the first classification 410c; the second classification 420b includes a different set of queries/test utterances than the second classification 420c; and the third classification 430b includes a difference set of queries/test utterances than the third classification 430c; etc.

As will be described in greater depth below, the systems and techniques described herein can perform FSOS-KWS to distinguish an unknown open-set from known-closed set classes in a per-episode manner (e.g., the unknown open-set can be uniquely distinguished from the known-closed for any given choice of N classes associated with the support set S provided to a given episode). The systems and techniques predict episode-specific (e.g., episode-known) dummies based on the support examples and/or support set S provided as input to each episode. The predicted episode-specific dummies are then classified as an episode-specific open-set that can subsequently be rejected or otherwise excluded from KWS classification. In one illustrative example, the systems and techniques can utilize Dummy Prototypical Networks (D-ProtoNets), as will be described in greater depth below.

Figure 5:
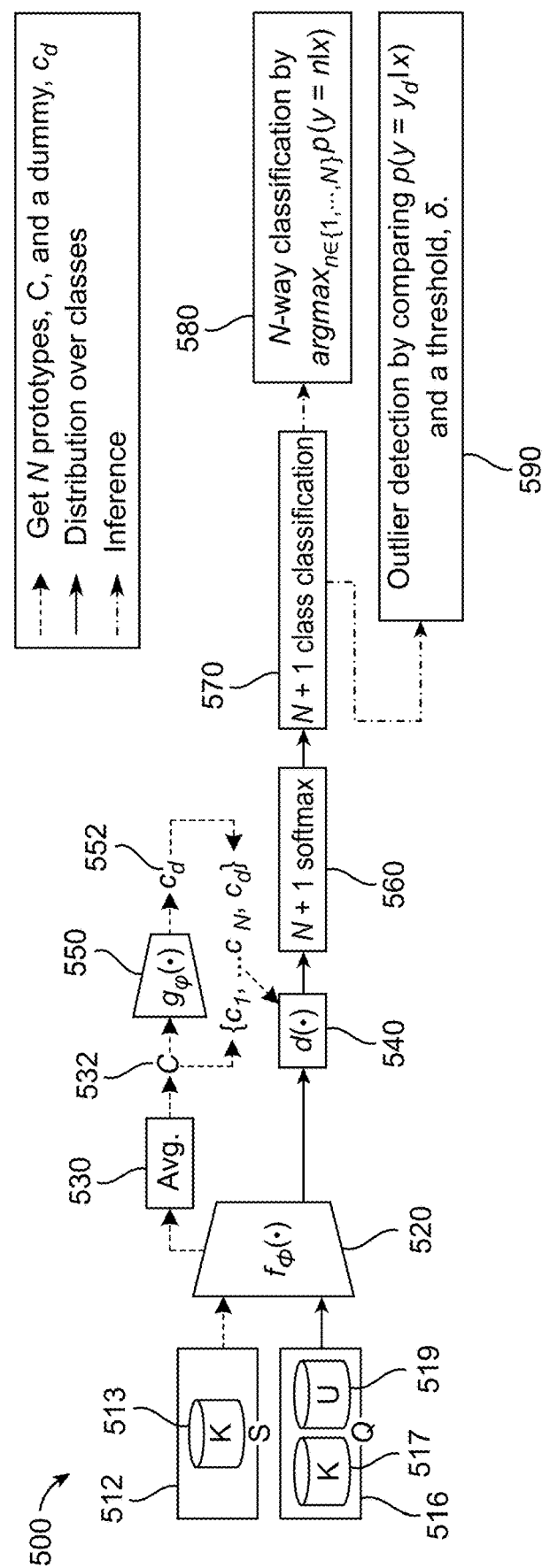
FIG. 5 is a diagram illustrating an example architecture of dummy prototypical network, in accordance with some examples.

FIG. 5 is a diagram illustrating an example of a dummy prototypical network (D-ProtoNet) 500 for performing FSOSR and/or FSOS-KWS with episode-specific open-set recognition and/or rejection. In one illustrative example, the dummy prototypical network 500 can perform FSOS-KWS with adaptation to a varying open-set between episodes. In some aspects, the dummy prototypical network 500 can perform FSOS-KWS by using metric-based learning to learn a metric space in which distance metrics can classify samples.

In the context of the following discussion, an FSOSR setting may include seen training data $D_{train}$ and unseen evaluation data $D_{eval}$ that do not overlap classes. For example, the seen training data $D_{train}$ can include a plurality of labeled samples, $$\{(x_i, y_i)\}_{i=1}^{|D_{train}|},$$

where $x_i$ is an input feature and $y_i$ is its corresponding label. In the example of FSOS-KWS, the input feature $x_i$ can be an utterance or other speech and/or audio data. The corresponding label $y_i$ can be a keyword class or classification for the input feature $x_i$.

In one illustrative example, training can be performed wherein a machine learning model (e.g., a neural network model) associated with the dummy prototypical network 500 learns from a plurality of N-way M-shot pseudo-FSOSR episodes. For example, each of the pseudo-FSOSR episodes can include N known classes with M support examples per class (e.g., such that each pseudo-FSOSR episode includes a total of N*M support examples) and one or more pseudo-unknown (e.g., pseudo-open-set) classes without any support examples.

The pseudo-episodes used in training can be designed to mimic the FSOSR inference task by subsampling classes as well as data points. With respect to the FSOSR inference task, inference can be performed over episodes that are each associated with a support set S and a query set Q. For example, FIG. 5 illustrates a support set S (indicated as 512) that includes a closed-set K (indicated as 513) of known classes for which support examples are provided.

FIG. 5 also illustrates a query set Q (indicated as 516) that includes both a closed set K (indicated as set 517) of known classes and an open-set U (indicated as set 519) of unknown classes without support examples. It is noted that although the set of closed-set samples 513 and the closed set 517 of samples correspond to the same underlying known classes, it is not necessarily the case that the constituent samples within 513 are the same as the constituent samples within the closed set 517

In one illustrative example, the support set S (e.g., 512) can include M samples for each of the N classes, as described above. The query set Q (e.g., 516) can include one or more queries from the N known classes (e.g., of the set 517) and can further include one or more queries from $N_U$ unknown classes (e.g., of the set 519), where:

$|S|=N\cdot M$ $|Q|=(N+N_U)\cdot M_Q$

Here, $M_Q$ can represent the number of queries for each class. At the time of inference, all classes in the evaluation data set $D_{eval}$ may be unseen by the dummy prototypical network 500. In some examples, the evaluation data set $D_{eval}$ can be the same as the query set 516. Inference can be performed using episodes that include N known classes with support samples (e.g., the set 517) and $N_U$ unknown open-set classes without support samples (e.g., the set 519). Note that in the inference episodes, the evaluation data set $D_{eval}$ (e.g., the set 517) does not necessarily include M support examples for each of the N classes, as is the case for the support set S (e.g., 512).

As mentioned previously, the dummy prototypical network 500 can perform FSOS-KWS based at least in part on one or more metric-based learning approaches. For example, in an N-way M-shot episode, the dummy prototypical network 500 can determine or otherwise obtain N prototypes, $\{c_n\}_{n=1}^{N}$, using the average of the embedded support samples of each class, n, to calculate the corresponding prototype for each class, where:

$$c_n = \frac{1}{M} \sum_{(x_i, y_i) \in S_n} f_\phi(x_i) \qquad \text{Eq. (1)}$$

Here, $S_n$ is a subset of the support set S (e.g., 512) whose labels are n; $|S_n|=M$; and $f_\phi$ is an encoder with q parameters. In the example of FIG. 5, the prototypes $c_n$ can be obtained based on determining the average of the embedded support samples of each class at the averaging engine 530. In one illustrative example, the individual prototypes are represented using the $c_n$ notation, while the C notation (e.g., indicated in FIG. 5 at block 532) can represent the set of N prototypes. As illustrated, $f_\phi$ is depicted as the encoder 520, which receives as input each episode the support set 512 and the query set 516. In one illustrative example, encoder 520 can be a neural network or other machine learning network that generates embeddings based on the support set 512 and/or query set 516 (e.g., the prototypes $c_n$ can be determined by averaging the embeddings generated for each class N by the encoder $f_\phi$ 520).

In one illustrative example, the encoder $f_\phi$ 520 can include or implement a machine learning backbone. For example, the encoder $f_\phi$ 520 can include or implement one or more of Conv4-64, ResNet-12, and/or BCResNet-8. In examples in which encoder $f_\phi$ 520 uses a Conv4-64 architecture, the output dimensions can be 768. In examples in which encoder $f_\phi$ 520 uses a ResNet-12 architecture, the output dimensions can be 512. In examples in which encoder $f_\phi$ 520 uses a BCResNet-8 architecture, the output dimensions can be 256. In some cases, a Conv4-64 architecture can be associated with 768 dimensions based at least in part on the absence of global average pooling at its output (e.g., yielding 768 dimensions, larger than its number of input channels, 64).

Based on the prototypes $c_n$, the dummy prototypical network 500 can determine or otherwise obtain a probability distribution over the N known classes:

$$p_\phi(y=n \mid x) = \frac{\exp(-d(f_\phi(x), c_n))}{\sum_{n'}^{N} \exp(-d(f_\phi(x), c_{n'}))} \quad \text{Eq. (2)}$$

Here, d(•) is a distance metric (e.g., indicated in FIG. 5 as the distance metric 540). In one illustrative example, the distance metric d(•) can be determined based on a Euclidean distance:

$$d(z,z')=\|z-z\zeta\|^2 \quad \text{Eq. (3)}$$

In some aspects, the distance metric d(•) can be determined or otherwise implemented using distance metrics other than a Euclidean distance (e.g., such as the Euclidean distance of Eq. (3)). In some examples, based on Eq. (2) and/or Eq. (3), the systems and techniques described herein can use the dummy prototypical network 500 to minimize a negative log-probability, which can be given as the negative log-probability $-\log p_0(y=n|x)$ of the true class n.

In one illustrative example, the probability distribution of Eq. (2) can be used to classify an input x by determining the distance (e.g., using the distance metric d(•) between the query example x and the prototypical representation $c_n$ for each class. For example, if the input query example x is closest to class number three (e.g., of the N classes), then a relatively high probability can be determined for class three and a relatively lower probability for the remaining N−1 classes. For example, these probabilities can be determined based on Eq. (2), which itself can be determined based on the distance metric d(•) (e.g., such as the Euclidean distance metric given in Eq. (3)).

In one illustrative example, the systems and techniques described herein can further determine one or more episode-known dummy prototypes in order to handle (e.g., reject from KWS) varying open-sets over multiple FSOS-KWS episodes. For example, the dummy prototypical network 500 can further include a dummy generator $g_\varphi$ 550 for determining or otherwise generating episode-known dummy prototypes. The dummy generator $g_\varphi$ 550 can generate an episode-known dummy prototype $c_d$ based on receiving as input the set of original prototypes C for the given episode (e.g., the set of prototypes C generated by averaging the embeddings output by encoder $f_\phi$ 520, using Eq. (1)). As will be explained in greater depth below, the dummy prototype $c_d$ generated by the dummy generator $g_\varphi$ 550 can be augmented to the original prototypes $C=\{c_1, \ldots, c_N\}$ to yield the augmented (e.g., dummy-augmented) prototype set $\{c_1, \ldots, c_N, c_d\}$.

In some examples, a set of N prototypes, $\{c_n\}_{n=1}^N$, can be used per inference episode of the dummy prototypical network 500, where $c \in R^{1 \times D}$ with the output dimension of $f_\phi$, D. In some cases, the prototypes can be permutation invariant to each other for the dummy prototypical network 500. In one illustrative example, the dummy generator $g_\varphi$ 550 can have parameters φ based on DeepSets. In some aspects, the dummy generator $g_\varphi$ 550 can be permutation invariant. In one illustrative example, the dummy generator $g_\varphi$ 550 can generate a dummy $c_d$ 552 using or otherwise given as input the N prototypes $C=[c_1; c_2; \ldots; c_N] \in R^{N \times D}$.

In one illustrative example, based on the dummy $c_d$ 552 being generated using the set of prototypes C that are determined for each class of the episode (e.g., uniquely determined based on the support set and/or support examples provided for the given episode), the generated dummy $c_d$ may be episode-specific and episode-known. As described previously, changes in the choice and/or composition of N can change the open-set (e.g., as described with respect to the first and second episodes shown in FIGS. 4B and 4C, respectively). In some aspects, based on the dummy $c_d$ 552 being generated based on the set of prototypes C that are determined uniquely for each class, dummy $c_d$ 552 is not static. For example, the dummy $c_d$ 552 can vary with the varying open-set caused by changes in N and/or the support set S.

In one illustrative example, the dummy representation $c_d$ 552 can be generated by the dummy generator $g_\varphi$ 550 as:

$$c_d = g_\varphi(C) = \text{Maxpool}(g_1(C))W_g \quad \text{Eq. (4)}$$

Here, $g_1$ includes fully-connected (FC) layers with non-linearity and $g_1(C) \in R^{N \times H}$ with a hidden dimension H. For example, $g_1$ can be a two-layer linear layer with a non-linearity level between the two linear layers. In some examples, the dummy generator $g=_\varphi$550 can use $g_1$ of FC-ReLU-FC with hidden D=32.

Following $g_1$, a maxpool can be applied. For example, the maxpool of Eq. (4) operates over N (e.g., the number of prototypes/classes) and outputs a feature in $R^{1 \times H}$. The feature output from the maxpool can undergo a matrix multiplication with $W_g$, which can be implemented as a learnable H×D matrix. The result of this matrix multiplication can be the generated dummy, $c_d$ 552, with $c_d \in R^{1 \times D}$.

As mentioned previously, an augmented prototype set, $\{c_L, \ldots, c_N, c_d\}$ can be obtained by appending the dummy prototype $c_d$ 552 (e.g., generated by dummy generator $g_\varphi$ 550) to the set of original prototypes C (e.g., generated by function generator $f_\phi$ 520 and averaging engine 530, where averaging engine 530 applies Eq. (1)).

In one illustrative example, the labels of open-set queries can be set to the N+1-th label $y_d$ which corresponds to the dummy $c_d$ 552. Using the dummy augmented prototypes $\{c_1, \ldots, c_N, c_d\}$, Eq. (2) can be modified to determine or otherwise obtain a probability distribution over the N+1 prototypes as:

$$p_\theta(y = n \mid x) = \frac{\exp(-d(f_\phi(x), c_n/\tau_n))}{\sum_{n'=1}^{N+1} \exp(-d(f_\phi(x), c_{n'}/\tau_n))} \qquad \text{Eq. (5)}$$

In some examples, the probability distribution over the N+1 prototypes (e.g., provided above in Eq. (5)) can be determined in a same or similar manner as the probability distribution over the N prototypes (e.g., previously described with respect to Eq. (2)). For example, the probability distribution over the N+1 prototypes can be determined using a softmax (e.g., the N+1 softmax 560 illustrated in FIG. 5) based on the same distance metric $d(\cdot)$ 540. In some examples, the distance metric 540 can be based on Euclidean distance, as described previously (e.g., with respect to Eq. (3)). The N+1 softmax 560 can be followed by an N+1 class classification 570 that can generate an N-way classification 580. In some aspects, the N+1 softmax 560 and the N+1 class classification 570 can be performed over the N classes and the newly generated, episode-specific dummy class ca. In one example, the N-way classification 580 can be generated based on an argmax function, such as $\text{argmax}_{n \in \{1, \ldots, N\}} p(y=n|x))$ as shown in FIG. 5.

In the example of Eq. (5), $\theta$ can represent or otherwise include the encoder 520 parameter $\phi$ and the dummy generator 550 parameter $\varphi$. In some cases, $\tau_n$ is a softmax temperature. For example, $\tau_n$ can be a softmax temperature associated with or implemented by the N+1 softmax 560. In some examples, the softmax temperature can be held constant or otherwise be the same over the different classes N.

In one illustrative example, the labels of the open-set queries can be set to the N+1-th label $y_d$ using the N+1 softmax 560 (e.g., as described previously). In some aspects, a larger $\tau_{N+1}$ compared to other $\tau_n \neq N+1$ can be used (e.g., can be used in or by the N+1 softmax 560) such that the dummy $c_d$ 552 affects the original N class classification to a lesser degree (e.g., $\tau_{N+1} = \gamma \cdot \tau_n \neq N+1$, where $\gamma > 1$). In some examples, during training, the softmax temperatures $\tau_{n \neq N+1}$ can be fixed to 1, with $\gamma = 3$ (e.g., $\tau_{N+1} = 3$) for the loss function $\mathcal{L}_{CE}$, which is described below with respect to Eq. (7).

In some aspects, the probability distribution of Eq. (5) can be output or otherwise determined using the N+1 softmax 560. During training, cross entropy loss for the known classes and cross entropy loss for the known classes can be determined and used to generate a combined loss or loss function that drives the training process. In one illustrative example, the N+1 class classification 570 can be learned (e.g., during training) using or more cross entropy losses, as given below:

$$\mathcal{L}_{CE}^K = \sum_{(x_i, y_i) \in Q_K} -\log p_\theta(y = y_i \mid x_i) \qquad \text{Eq. (6)}$$

$$\mathcal{L}_{CE}^U = \sum_{(x_i, y_d) \in Q_U} -\log p_\theta(y = y_d \mid x_i) \qquad \text{Eq. (7)}$$

Here, $Q_K$ and $Q_U$ are known and unknown queries, respectively, of the query set Q 516. For example, $Q_K$ can be a known query from the set 517 of known queries and $Q_U$ can be an unknown query from the set 519 of unknown queries, both illustrated in FIG. 5 as included within the query set Q 516.

In some cases, the two losses given in Eq. (6) and Eq. (7) can be balanced by a hyperparameter $\lambda$, with the total loss function (e.g., again, a cross entropy loss) given as:

$$\mathcal{L}_{CE} = \mathcal{L}_{CE}^K + \lambda \cdot \mathcal{L}_{CE}^U \qquad \text{Eq. (8)}$$

In some examples, the hyperparameter $\lambda$ can be set equal to 0.1, although other hyperparameter values can also be utilized. Using the cross entropy loss of Eq. (8), the dummy prototypical networks described herein (e.g., dummy prototypical network 500) can be trained simultaneously on the dummy prototype $c_d$ generated using dummy generator $g_\varphi$ 550 and the set of original prototypes C generated using function generator $f_\phi$ 520.

During inference, the cross entropy loss (e.g., of Eqs. (6)-(8)) is no longer needed or utilized. In one illustrative example, N+1 classes can be identified based on or using the N+1 softmax output. For example, the output of the N+1 softmax 560 can be used to detect and reject open-set queries. As illustrated in FIG. 5, the dummy prototypical network 500 can include an outlier detection engine 590, which can be used to detect the open-set queries for a given FSOS-KWS episode.

In one illustrative example, outlier detection engine 590 can detect open-set queries for a given FSOS-KWS episode based on the probability over the dummy class $c_d$. For example, outlier detection engine 590 can determine whether a given belongs to an open-set (e.g., and therefore is an outlier and/or should be rejected) based on:

$$p_\theta(y_i = y_d | x_i) \qquad \text{Eq. (9)}$$

In some examples, the probability $p_\theta$ given by Eq. (9) can represent the probability that the given query $x_i$ belongs to the dummy class $c_d$ (e.g., where $y_i$ represents the label or classification for the query $x_i$; $y_d$ represents the label or classification assigned to the dummy class $c_d$ 552; and the labels of open-set queries can be set to the N+1-th label $y_d$).

In one illustrative example, outlier detection engine 590 can detect or otherwise determine that the given query $x_i$ belongs to the open-set based on comparing or analyzing the above probability of Eq. (9) (e.g., $p_\theta(y_i = y_d | x_i)$) against a threshold $\delta$.

As illustrated in FIG. 5, the classification output of the N+1 classifier 570, with the open-set rejection applied by outlier detection engine 590, is an N-way classification by $\arg\max_{n \in \{1, \ldots, N\}} p_\theta(y = n | x_i)$.

In some examples, the dummy prototypical network of FIG. 5 can be tested by classifying N known classes by:

$$\hat{y}_i = \arg\max_{n \in \{1, \ldots, N\}} p_\theta(y = n | x_i) \qquad \text{Eq. (10)}$$

To verify if a given $x_i$ is or otherwise belongs to an open-set, the probability $p_\theta(y_i = y_d | x_i)$ given by Eq. (9) can be compared to or analyzed against the threshold $\delta$ (e.g., testing can be performed the same as or similar to the inference described above).

In one illustrative example, the systems and techniques described herein can utilize multiple dummies, L. For example, the example prototypical network 500 illustrated in FIG. 5 can include or generate multiple dummies, L, based on setting the learnable matrix $W_g$ (e.g., of Eq. (4)) to be a matrix of dimension $H \times (L \cdot D)$. It is noted that in the single dummy example discussed above, the learnable matrix $W_g$ was provided as a matrix of dimension $H \times D$ (e.g., with $L = 1$).

In some cases, based at least in part on the use of the learnable matrix $W_g$ with dimensions $H \times (L \cdot D)$, the example prototypical network 500 can naively choose a most probable one of the L dummies for a given input $x_i$ by: $\text{argmax}_l (-d(x_i, c_l))$.

In one illustrative example, a Gumbel softmax can be used to replace the non-differentiable sample (e.g., argmax) with a differentiable sample. For example, using the Gumbel softmax, the probability of choosing a dummy l of the set of multiple dummies L can be given as:

$$p(y^L = l \mid x) = \frac{\exp((-d(f_\phi(x), c_{l'}) + \in_{l'})/\tau)}{\sum_{l'=1}^{L} \exp((-d(f_\phi(x), c_{l'}) + \in_{l'})/\tau)} \quad \text{Eq. (11)}$$

Here, $\in_1, \ldots, \in_L$ are independent and identically distributed (IID) samples drawn from the standard Gumbel distribution of $\mu=0$ and $\beta=1$. $y^L$ is a temporal dummy label among the L dummies. In some examples, training can be performed to yield:

$$c_d = \Sigma_l p(y^L = l \mid x) \cdot c_l \quad \text{Eq. (12)}$$

In one illustrative example, at inference, a single dummy $y^L$ of the multiple dummies L can be chosen for use in performing open-set recognition (OSR). For example, the single dummy $y^L$ can be selected by:

$$\arg\max_l p(y^L = l \mid x) \quad \text{Eq. (13)}$$

For example, the selected dummy $y^L$ can be used to classify and rejecting the open-set queries as the dummy class, in a same or similar manner as described above with respect to the example in which dummy generator 550 generates a single dummy.

In one illustrative example, training and/or inference can be performed with the r term in the Gumbel softmax (e.g., in Eq. (11), above) annealed from 2 to 0.5. In some examples, when multiple dummies L are utilized, the number of dummies can be L=3, although it is noted that a greater or lesser number of dummies L can also be utilized without departing from the scope of the present disclosure.

In some examples, one or more speech commands datasets can be used for training, validation, and/or testing of the systems and techniques described herein. In one illustrative example, a speech commands dataset can include 35 keywords in total and can be used to support 12 class classifications. For example, the 12 classes can include 10 keywords (e.g., "Yes", "No," "Up," "Down," "Left," "Right," "On," "Off," "Stop," and "Go") and two additional classes. The two additional classes can include an "Unknown Words" class which includes the 25 remaining keywords (e.g., the 35 total keywords in the speech commands dataset, minus the 10 keywords above), and a "Silence" class. In some cases, the "Silence" class can include background noise only.

In some examples, the speech commands dataset can be split by class label. For example, a split can performed to establish 15 keywords for a training set, 10 keywords for a validation set, and 10 keywords for a test set:
Train keywords: "Happy," "House," "Bird," "Bed," "Backward," "Sheila," "Marvin," "Wow," "Tree," "Follow," "Dog," "Visual," "Forward," "Learn," and "Cat"
Validation Keywords (e.g., numbers): "Zero," "One," "Two," "Three," "Four," "Five,"
"Six," "Seven," "Eight," and "Nine" Test keywords (10 keyword classes used in a conventional 12 class KWS): "Yes", "No", "Up", "Down", "Left", "Right", "On", "Off", "Stop," and "Go".

In some cases, the use of fixed keyword splits can prevent possible performance variance from split changes over trials. On top of the split, the particular class "Silence" can be added, which can only be included in an open-set as a background noise class. For example, in a 5-way 5-shot episode, five known classes without "Silence" can randomly be chosen and the same number of open-set classes from the remaining classes, including "Silence," can also be chosen. In some examples, these settings can be referred to as a split speech commands dataset.

In some examples, the underlying speech commands dataset (e.g., prior to the application of the split described above) can be the Google speech commands (GSC) dataset ver2, containing 105,829 utterances from 2,618 speakers. As described above, the dataset can first be split into train, validate, and test sets having 84,843, 9,981, and 11,005 utterances, respectively, using the official split (e.g., using a hash function on the name of each utterance file).

Subsequently, samples can be chosen based on the split speech commands dataset approach described above, to obtain 22,916, 3,643, and 4,074 samples for train, validation, and test, respectively. "Silence" samples can be added to each split by the average number of utterances per class of each split, resulting in a final split speech commands dataset including 24,444, 4,007, and 4,482 utterances for train, validation and test, respectively. In some examples, training can be performed using minimal data augmentation commonly used in GSC tasks, adding official background noise offered by GSC with the probability of 0.8.

In some aspects, the encoder $f_\phi$ 520 can include or implement a machine learning backbone (e.g., as described above). For example, the encoder $f_\phi$ 520 can include or implement one or more of Conv4-64, ResNet-12, and/or BCResNet-8. In examples in which encoder $f_\phi$ 520 uses a Conv4-64 architecture, the output dimensions can be 768. In examples in which encoder $f_\phi$ 520 uses a ResNet-12 architecture, the output dimensions can be 512. In examples in which encoder $f_\phi$ 520 uses a BCResNet-8 architecture, the output dimensions can be 256. In some cases, a Conv4-64 architecture can be associated with 768 dimensions based at least in part on the absence of global average pooling at its output (e.g., yielding 768 dimensions, larger than its number of input channels, 64).

In some aspects, each utterance in GSC is 1 second in length and the sampling rate is 16 kHz. During training (e.g., using the final split speech commands dataset described above), input features of 40-dimensional log Mel-spectrograms with frameshift and window length of and 30 milliseconds (ms), respectively, can be used. In some examples, the dummy prototypical network described herein (e.g., the dummy prototypical network 500 illustrated in FIG. 5) can be trained for 100 epochs with Adam optimizer of initial learning rate of 0.001. The learning rate can be step decayed by multiplying by 0.5 every 20 epochs. Each epoch can include 100 episodes, with each episode including 5 known (e.g., 5-way) and 5 open-set classes. 5 support examples (e.g., 5-shot) can be used or provided for each episode. During training, five queries can be provided or otherwise utilized for each class. During testing, 15 queries can be provided or otherwise utilized for each class. In some examples, early-stop can be used by few-shot validation accuracy and a trained model can be evaluated with 1,000 episodes.

Figure 6:
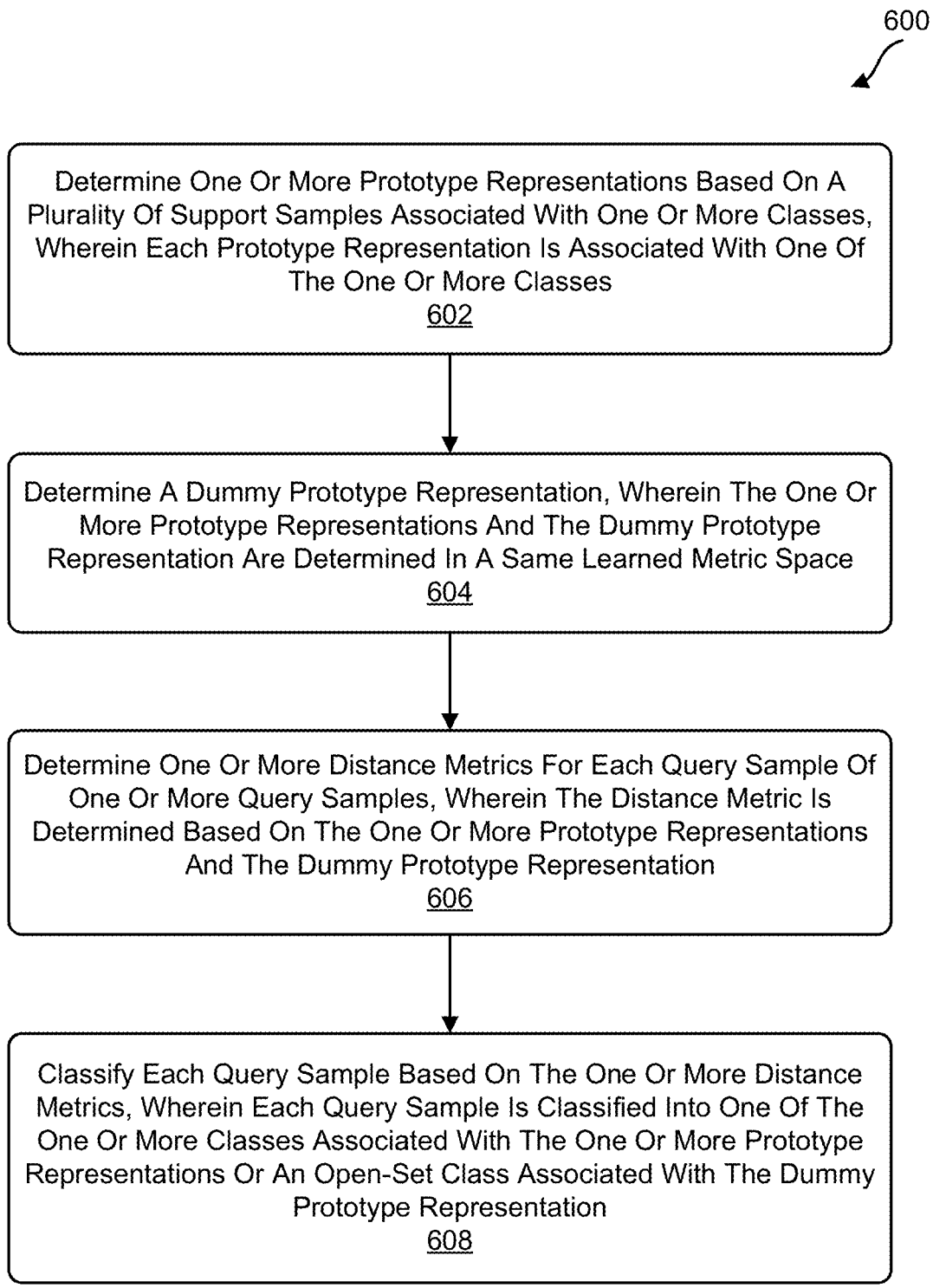
FIG. 6 is a flow diagram illustrating an example of a process for processing one or more data samples (e.g., of an audio signal) to perform keyword spotting (KWS)

FIG. 6 is a flowchart illustrating an example of a process 600 for processing one or more data samples (e.g., one or more data samples of audio data). At block 602, the process 600 includes determining one or more prototype representations based on a plurality of support samples associated with one or more classes, wherein each prototype representation is associated with one of the one or more classes. For example, the one or more prototype representations can be determined using the dummy prototypical network 500 illustrated in FIG. 5. In some examples, the one or more prototype representations can be determined by a machine learning and/or neural network encoder, such as the neural network encoder 520 illustrated in FIG. 5. The one or more prototype representations can be determined based on receiving as input the plurality of support samples, wherein each support sample is associated with (e.g., labeled with) a known class. In some examples, the encoder (e.g., encoder 520) can generate a plurality of embeddings for the plurality of support samples associated with each keyword class. A prototype representation can then be determined for each keyword class as the mean of its embedded support samples. For example, the mean of the embedded support samples for each class can be determined using the averaging engine 530 illustrated in FIG. 5.

In some examples, the one or more classes can be keyword classes (e.g., of a keyword spotting (KWS) system). In some cases, each prototype representation can be determined using a plurality of support samples that are associated with one of the keyword classes. For example, each prototype representation can be determined for one keyword class of a plurality of keyword classes, wherein the prototype representation for the keyword class is determined based on the support samples associated with the same keyword class.

At block 604, the process 600 includes determining a dummy prototype representation, wherein the one or more prototype representations and the dummy prototype representation are determined in a same learned metric space. For example, the dummy prototype representation can be determined using the dummy generator 550 illustrated in FIG. 5. In some examples, the dummy prototype representation can be determined using the prototype representations determined for each known class (e.g., as described above with respect to block 602) as input. In some examples, the one or more prototype representations and the dummy prototype representation can be determined in a same learned embedding space of a neural network encoder (e.g., the dummy prototype representation can be determined in the same embedding space associated with the encoder 520).

In some examples, a dummy generator network (e.g., dummy generator 550) can be used to determine the dummy prototype representation. For example, the dummy generator network can be a machine learning network that includes one or more linear layers and a maxpool layer. The one or more linear layers can receive as input the one or more prototype representations (e.g., from encoder 520 and averaging engine 530, both illustrated in FIG. 5). The maxpool layer can receive as input an output of the one or more linear layers.

In some examples, determining the dummy prototype representation further includes generating, using the dummy generator network (e.g., dummy generator 550) a plurality of dummy prototypes. The dummy prototype representation can be a single dummy prototype selected from the plurality of dummy prototypes. For example, the dummy prototype representation can be a single dummy prototype selected from the plurality of dummy prototypes based on a Gumbel softmax.

At block 606, the process 600 includes determining one or more distance metrics for each query sample of one or more query samples, wherein the one or more distance metrics are determined based on the one or more prototype representations and the dummy prototype representation. For example, the one or more distance metrics can be determined using a distance metric 540, as illustrated in FIG. 5. In some examples, the distance metric can be a Euclidean distance between each query sample and each of the prototype representations and the dummy prototype representation.

At block 608, the process 600 includes classifying each query sample based on the one or more distance metrics, wherein each query sample is classified into one of the one or more classes associated with the one or more prototype representations or an open-set class associated with the dummy prototype representation. For example, the query samples can be classified using a softmax, such as the N+1 softmax 560 illustrated in FIG. 5. In some examples, the softmax classification can be based on or otherwise utilize the distance metrics described above with respect to block 606. For example, the softmax classification can classify a given query sample into one of the classes associated with the prototype representations or into an open-set class associated with the dummy prototype representation.

In some examples, classifying each query sample based on the one or more distance metrics includes determining a probability distribution over the one or more classes and the open-set class, wherein the probability distribution is determined based at least in part on a Euclidean distance metric, such as the Euclidean distance metric described above. For example, a given query sample can have a relatively higher probability of being classified into a given one of the classes or the open-set class as the Euclidean distance (or distance metric) determined between the query sample and one of the classes (or open-set class) decreases. In some examples, each query sample can be classified into one of the one or more classes associated with the prototype representations or into the open-set class associated with the dummy prototype representation, based on the probability distribution. In some examples, open-set rejection (OSR) can be performed based on a set of classified query samples classified into the open-set class associated with the dummy prototype representation.

In some examples, the processes described herein (e.g., process 600 and/or any other process described herein) may be performed by a computing device, apparatus, or system. In one example, the process 600 can be performed by a computing device or system having the computing device architecture 700 of FIG. 7. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
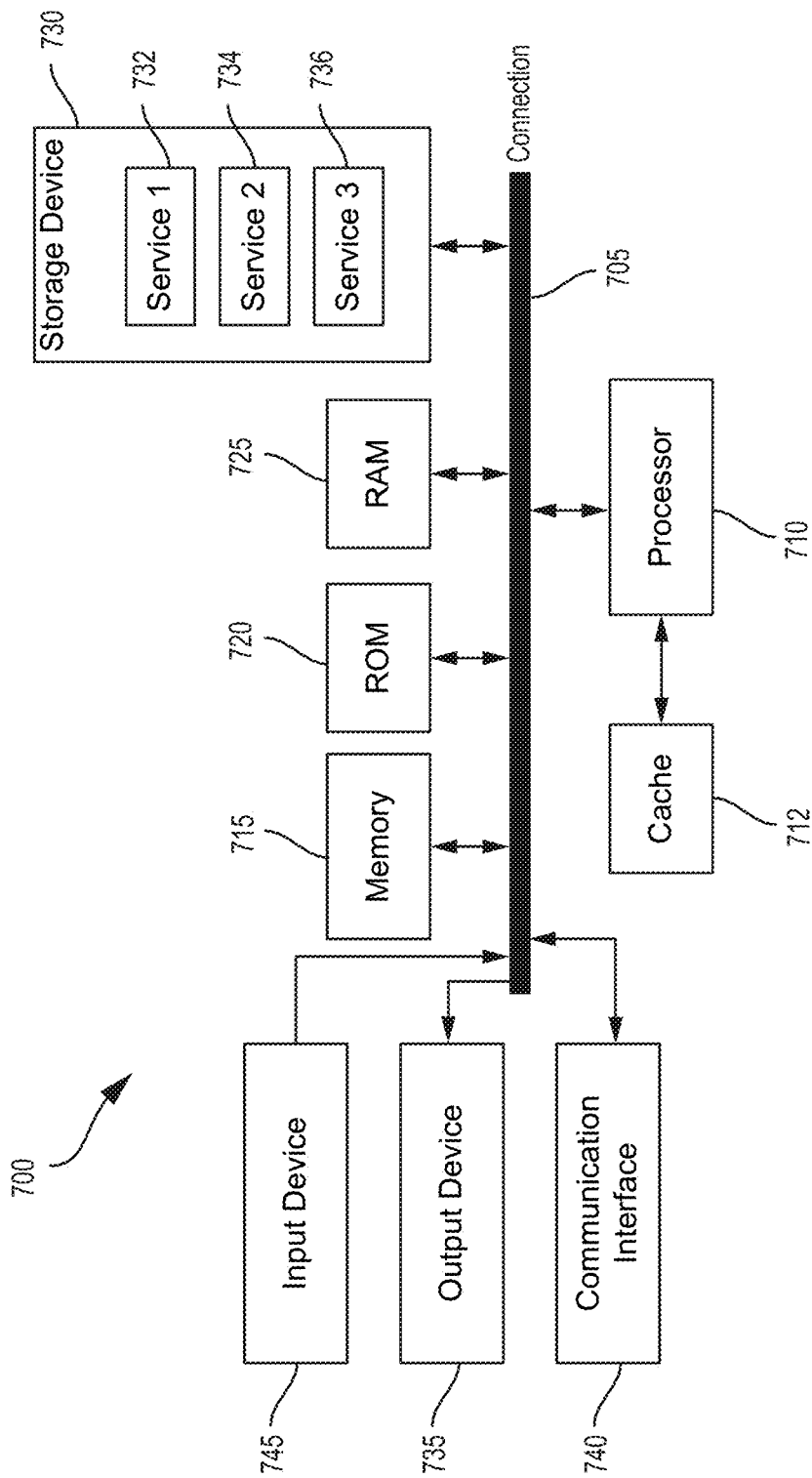
FIG. 7 is a block diagram illustrating an example of a computing system for implementing certain aspects described herein.

FIG. 7 illustrates an example computing device architecture 700 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 700 are shown in electrical communication with each other using connection 705, such as a bus. The example computing device architecture 700 includes a processing unit (CPU or processor) 710 and computing device connection 705 that couples various computing device components including computing device memory 715, such as read only memory (ROM) 720 and random-access memory (RAM) 725, to processor 710.

Computing device architecture 700 can include a cache of high-speed memory connected directly with, in close proximity to, or integrated as part of processor 710. Computing device architecture 700 can copy data from memory 715 and/or the storage device 730 to cache 712 for quick access by processor 710. In this way, the cache can provide a performance boost that avoids processor 710 delays while waiting for data. These and other engines can control or be configured to control processor 710 to perform various actions. Other computing device memory 715 may be available for use as well. Memory 715 can include multiple different types of memory with different performance characteristics. Processor 710 can include any general-purpose processor and a hardware or software service, such as service 1 732, service 2 734, and service 3 736 stored in storage device 730, configured to control processor 710 as well as a special-purpose processor where software instructions are incorporated into the processor design. Processor 710 may be a self-contained system, containing multiple cores or processors, a bus, memory controller, cache, etc. A multi-core processor may be symmetric or asymmetric.

To enable user interaction with the computing device architecture 700, input device 745 can represent any number of input mechanisms, such as a microphone for speech, a touch-sensitive screen for gesture or graphical input, keyboard, mouse, motion input, speech and so forth. Output device 735 can also be one or more of a number of output mechanisms known to those of skill in the art, such as a display, projector, television, speaker device, etc. In some instances, multimodal computing devices can enable a user to provide multiple types of input to communicate with computing device architecture 700. Communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. Storage device 730 can include services 732, 734, 736 for controlling processor 710. Other hardware or software modules or engines are contemplated. Storage device 730 can be connected to the computing device connection 705. In one aspect, a hardware module that performs a particular function can include the software component stored in a computer-readable medium in connection with the necessary hardware components, such as processor 710, connection 705, output device 735, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details.

For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like.

The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for processing one or more data samples, comprising: determining one or more prototype representations based on a plurality of support samples associated with one or more classes, wherein each prototype representation is associated with one of the one or more classes; determining a dummy prototype representation, wherein the one or more prototype representations and the dummy prototype representation are determined in a same learned metric space; determining one or more distance metrics for each query sample of one or more query samples, wherein the one or more distance metrics are determined based on the one or more prototype representations and the dummy prototype representation; and classifying each query sample based on the one or more distance metrics, wherein each query sample is classified into one of the one or more classes associated with the one or more prototype representations or an open-set class associated with the dummy prototype representation.

Aspect 2: The method of Aspect 1, wherein classifying each query sample based on the one or more distance metrics includes: determining a probability distribution over the one or more classes and the open-set class, wherein the probability distribution is determined based at least in part on a Euclidean distance metric; classifying, based on the probability distribution, each query sample into one of the one or more classes or into the open-set class; and performing open-set rejection (OSR) based on a set of classified query samples classified into the open-set class associated with the dummy prototype representation.

Aspect 3: The method of any of Aspects 1 to 2, wherein the one or more classes are keyword classes and each prototype representation is determined using a plurality of support samples associated with a keyword class.

Aspect 4: The method of Aspect 3, further comprising: generating, using a neural network encoder, a plurality of embeddings for the plurality of support samples associated with the keyword class, the plurality of embeddings including an embedding for each support sample of the plurality of support samples; and determining each prototype representation based on an average of the plurality of embeddings generated for the plurality of support samples.

Aspect 5: The method of Aspect 4, wherein the one or more prototype representations and the dummy prototype representation are determined in a same learned embedding space of the neural network encoder.

Aspect 6: The method of any of Aspects 1 to 5, further including determining the dummy prototype representation using a dummy generator network, wherein: the dummy generator network includes one or more linear layers and a maxpool layer; the one or more linear layers receive as input the one or more prototype representations; and the maxpool layer receives as input an output of the one or more linear layers.

Aspect 7: The method of Aspect 6, wherein determining the dummy prototype representation further comprises: generating, using the dummy generator network, a plurality of dummy prototypes; and determining the dummy prototype representation by selecting one of the plurality of dummy prototypes based on a Gumbel softmax.

Aspect 8: The method of any of Aspects 1 to 3, wherein the keyword classes comprise a closed-set of known classes.

Aspect 9: The method of any of Aspects 1 to 8, wherein: the one or more query samples include speech audio data; and the plurality of support samples includes speech audio data labeled with a corresponding one of the one or more classes for each support sample of the plurality of support samples.

Aspect 10: The method of any of Aspects 1 to 9, wherein the plurality of support samples is obtained for a single few-shot learning (FSL) episode and the dummy prototype representation is an episode-known dummy prototype representation.

Aspect 11: An apparatus for processing one or more data samples, comprising: at least one memory; and at least one processor coupled to the at least one memory, the at least one processor configured to: determine one or more prototype representations based on a plurality of support samples associated with one or more classes, wherein each prototype representation is associated with one of the one or more classes; determine a dummy prototype representation, wherein the one or more prototype representations and the dummy prototype representation are determined in a same learned metric space; determine one or more distance metrics for each query sample of one or more query samples, wherein the one or more distance metrics are determined based on the one or more prototype representations and the dummy prototype representation; and classify each query sample based on the one or more distance metrics, wherein each query sample is classified into one of the one or more classes associated with the one or more prototype representations or an open-set class associated with the dummy prototype representation.

Aspect 12: The apparatus of Aspect 11, wherein to classify each query sample based on the one or more distance metric, the at least one processor is configured to: determine a probability distribution over the one or more classes and the open-set class, wherein the probability distribution is determined based at least in part on a Euclidean distance metric; classify, based on the probability distribution, each query sample into one of the one or more classes or into the open-set class; and perform open-set rejection (OSR) based on a set of classified query samples classified into the open-set class associated with the dummy prototype representation.

Aspect 13: The apparatus of any of Aspects 11 to 12, wherein the one or more classes are keyword classes and the at least one processor is configured to determine each prototype representation using a plurality of support samples associated with a keyword class.

Aspect 14: The apparatus of Aspect 13, wherein the at least one processor is further configured to: generate, using a neural network encoder, a plurality of embeddings for the plurality of support samples associated with the keyword class, the plurality of embeddings including an embedding for each support sample of the plurality of support samples; and determine each prototype representation based on an average of the plurality of embeddings generated for the plurality of support samples.

Aspect 15: The apparatus of Aspect 14, wherein the at least one processor is configured to determine the one or more prototype representations and the dummy prototype representation in a same learned embedding space of the neural network encoder.

Aspect 16: The apparatus of any of Aspects 11 to 15, wherein the at least one processor is further configured to determine the dummy prototype representation using a dummy generator network, wherein: the dummy generator network includes one or more linear layers and a maxpool layer; the one or more linear layers receive as input the one or more prototype representations; and the maxpool layer receives as input an output of the one or more linear layers.

Aspect 17: The apparatus of Aspect 16, wherein to determine the dummy prototype representation, the at least one processor is configured to: generate, using the dummy generator network, a plurality of dummy prototypes; and determine the dummy prototype representation by selecting one of the plurality of dummy prototypes based on a Gumbel softmax.

Aspect 18: The apparatus of any of Aspects 11 to 13, wherein the keyword classes comprise a closed-set of known classes.

Aspect 19: The apparatus of any of Aspects 11 to 18, wherein: the one or more query samples include speech audio data; and the plurality of support samples includes speech audio data labeled with a corresponding one of the one or more classes for each support sample of the plurality of support samples.

Aspect 20: The apparatus of any of Aspects 11 to 19, wherein the plurality of support samples is obtained for a single few-shot learning (FSL) episode and the dummy prototype representation is an episode-known dummy prototype representation.

Aspect 21: A non-transitory computer-readable storage medium comprising instructions stored thereon which, when executed by at least one processor, causes the at least one processor to: determine one or more prototype representations based on a plurality of support samples associated with one or more classes, wherein each prototype representation is associated with one of the one or more classes; determine a dummy prototype representation, wherein the one or more prototype representations and the dummy prototype representation are determined in a same learned metric space; determine one or more distance metrics for each query sample of one or more query samples, wherein the one or more distance metrics are determined based on the one or more prototype representations and the dummy prototype representation; and classify each query sample based on the one or more distance metrics, wherein each query sample is classified into one of the one or more classes associated with the one or more prototype representations or an open-set class associated with the dummy prototype representation.

Aspect 22: The non-transitory computer-readable storage medium of Aspect 21, wherein, to classify each query sample based on the one or more distance metrics, the instructions cause the at least one processor to: determine a probability distribution over the one or more classes and the open-set class, wherein the probability distribution is determined based at least in part on a Euclidean distance metric; classify, based on the probability distribution, each query sample into one of the one or more classes or into the open-set class; and perform open-set rejection (OSR) based on a set of classified query samples classified into the open-set class associated with the dummy prototype representation.

Aspect 23: The non-transitory computer-readable storage medium of any of Aspects 21 to 22, wherein the one or more classes are keyword classes and the at least one processor is configured to determine each prototype representation using a plurality of support samples associated with a keyword class.

Aspect 24: The non-transitory computer-readable storage medium of Aspect 23, wherein the instructions further cause the at least one processor to: generate, using a neural network encoder, a plurality of embeddings for the plurality of support samples associated with the keyword class, the plurality of embeddings including an embedding for each support sample of the plurality of support samples; and determine each prototype representation based on an average of the plurality of embeddings generated for the plurality of support samples.

Aspect 25: The non-transitory computer-readable storage medium of Aspect 24, wherein the instructions cause the at least one processor to determine the one or more prototype representations and the dummy prototype representation in a same learned embedding space of the neural network encoder.

Aspect 26: The non-transitory computer-readable storage medium of any of Aspects 21 to 25, wherein the instructions further cause the at least one processor to determine the dummy prototype representation using a dummy generator network, wherein: the dummy generator network includes one or more linear layers and a maxpool layer; the one or more linear layers receive as input the one or more prototype representations; and the maxpool layer receives as input an output of the one or more linear layers.

Aspect 27: The non-transitory computer-readable storage medium of Aspect 26, wherein, to determine the dummy prototype representation, the instructions cause the at least one processor to: generate, using the dummy generator network, a plurality of dummy prototypes; and determine the dummy prototype representation by selecting one of the plurality of dummy prototypes based on a Gumbel softmax.

Aspect 28: The non-transitory computer-readable storage medium of any of Aspects 23 to 27, wherein the keyword classes comprise a closed-set of known classes.

Aspect 29: The non-transitory computer-readable storage medium of any of Aspects 21 to 28, wherein: the one or more query samples include speech audio data; and the plurality of support samples includes speech audio data labeled with a corresponding one of the one or more classes for each support sample of the plurality of support samples.

Aspect 30: The non-transitory computer-readable storage medium of any of Aspects 21 to 29, wherein the plurality of support samples is obtained for a single few-shot learning (FSL) episode and the dummy prototype representation is an episode-known dummy prototype representation.

Aspect 31: A computer-readable storage medium storing instructions that, when executed by one or more processors, cause the one or more processors to perform operations according to any of Aspects 1 to 30.

Aspect 32: An apparatus for processing one or more data samples, comprising one or more means for performing operations according to any of Aspects 1 to 30.

What is claimed is:

1. A method for processing one or more data samples, comprising:
   obtaining a support set corresponding to a few shot learning (FSL) inference episode associated with a first machine learning network, wherein the support set includes a plurality of labeled support samples associated with one or more known classes of the support set;
   determining a set of prototype representations based on the plurality of labeled support samples, wherein the set of prototype representations is determined in a learned embedding space of the first machine learning network, and wherein each prototype representation of the set of prototype representations corresponds to a respective known class of the one or more known classes;
   generating, based on processing the set of prototype representations using a second machine learning network, a dummy prototype representation corresponding to a predicted dummy class for the FSL inference episode, wherein the second machine learning network generates the dummy prototype representation in the same learned embedding space used to determine the set of prototype representations;
   determining one or more distance metrics for each query sample of one or more query samples corresponding to the FSL inference episode, wherein the one or more distance metrics are determined based on an augmented prototype set comprising the set of prototype representations and the dummy prototype representation; and
   classifying each query sample of the one or more query samples based on the one or more distance metrics between each query sample and the augmented prototype set, wherein each query sample is classified into one of the one or more known classes associated with the set of prototype representations or is classified into an open-set class associated with the dummy prototype representation, and wherein the open-set class is not included in the one or more known classes.

2. The method of claim 1, wherein classifying each query sample based on the one or more distance metrics includes:
   determining a probability distribution over the one or more known classes and the open-set class, wherein the probability distribution is determined based at least in part on a Euclidean distance metric;
   classifying, based on the probability distribution, each query sample into one of the one or more known classes or into the open-set class; and
   performing open-set rejection (OSR) based on a set of classified query samples classified into the open-set class associated with the dummy prototype representation.

3. The method of claim 1, wherein the one or more known classes are keyword classes, and wherein each prototype representation is determined using a plurality of support samples associated with a keyword class.

4. The method of claim 3, further comprising:
generating, using a neural network encoder of the first machine learning network, a plurality of embeddings for the plurality of support samples associated with the keyword class, the plurality of embeddings including an embedding for each support sample of the plurality of support samples; and
determining each prototype representation based on an average of the plurality of embeddings generated for the plurality of support samples.

5. The method of claim 4, wherein the learned embedding space is a learned embedding space of the neural network encoder.

6. The method of claim 3, wherein the keyword classes comprise a closed-set of known classes.

7. The method of claim 1, wherein the second machine learning network is a dummy generator network, wherein:
the dummy generator network includes one or more linear layers and a maxpool layer;
the one or more linear layers receive as input the set of prototype representations; and
the maxpool layer receives as input an output of the one or more linear layers.

8. The method of claim 7, wherein generating the dummy prototype representation further comprises:
generating, using the dummy generator network, a plurality of dummy prototypes; and
determining the dummy prototype representation by selecting one of the plurality of dummy prototypes based on a Gumbel softmax.

9. The method of claim 1, wherein:
the one or more query samples include speech audio data; and
the plurality of labeled support samples includes speech audio data labeled with a corresponding one of the one or more known classes for each labeled support sample of the plurality of labeled support samples.

10. The method of claim 1, wherein the dummy prototype representation is an episode-known dummy prototype representation corresponding to an open set of unknown classes specific for the FSL inference episode.

11. An apparatus for processing one or more data samples, comprising:
at least one memory; and
at least one processor coupled to the at least one memory, the at least one processor configured to:
obtain a support set corresponding to a few shot learning (FSL) inference episode associated with a first machine learning network, wherein the support set includes a plurality of labeled support samples associated with one or more known classes of the support set;
determine a set of prototype representations based on the plurality of labeled support samples, wherein the set of prototype representations is determined in a learned embedding space of the first machine learning network, and wherein each prototype representation of the set of prototype representations corresponds to a respective known class of the one or more known classes;
generate, based on processing the set of prototype representations using a second machine learning network, a dummy prototype representation corresponding to a predicted dummy class for the FSL inference episode, wherein the second machine learning network generates the dummy prototype representation in the same learned embedding space used to determine the set of prototype representations;
determine one or more distance metrics for each query sample of one or more query samples corresponding to the FSL inference episode, wherein the one or more distance metrics are determined based on an augmented prototype set comprising the set of prototype representations and the dummy prototype representation; and
classify each query sample of the one or more query samples based on the one or more distance metrics between each query sample and the augmented prototype set, wherein each query sample is classified into one of the one or more known classes associated with the set of prototype representations or is classified into an open-set class associated with the dummy prototype representation, and wherein the open-set class is not included in the one or more known classes.

12. The apparatus of claim 11, wherein, to classify each query sample based on the one or more distance metrics, the at least one processor is configured to:
determine a probability distribution over the one or more known classes and the open-set class, wherein the probability distribution is determined based at least in part on a Euclidean distance metric;
classify, based on the probability distribution, each query sample into one of the one or more known classes or into the open-set class; and
perform open-set rejection (OSR) based on a set of classified query samples classified into the open-set class associated with the dummy prototype representation.

13. The apparatus of claim 11, wherein the one or more known classes are keyword classes and the at least one processor is configured to determine each prototype representation using a plurality of support samples associated with a keyword class.

14. The apparatus of claim 13, wherein the at least one processor is further configured to:
generate, using a neural network encoder of the first machine learning network, a plurality of embeddings for the plurality of support samples associated with the keyword class, the plurality of embeddings including an embedding for each support sample of the plurality of support samples; and
determine each prototype representation based on an average of the plurality of embeddings generated for the plurality of support samples.

15. The apparatus of claim 14, wherein the learned embedding space is a learned embedding space of the neural network encoder.

16. The apparatus of claim 13, wherein the keyword classes comprise a closed-set of known classes.

17. The apparatus of claim 11, wherein the second machine learning network is a dummy generator network, wherein:
the dummy generator network includes one or more linear layers and a maxpool layer;
the one or more linear layers receive as input the set of prototype representations; and
the maxpool layer receives as input an output of the one or more linear layers.

18. The apparatus of claim 17, wherein, to generate the dummy prototype representation, the at least one processor is configured to:

generate, using the dummy generator network, a plurality of dummy prototypes; and
determine the dummy prototype representation by selecting one of the plurality of dummy prototypes based on a Gumbel softmax.

19. The apparatus of claim 11, wherein:
the one or more query samples include speech audio data; and
the plurality of labeled support samples includes speech audio data labeled with a corresponding one of the one or more known classes for each labeled support sample of the plurality of labeled support samples.

20. The apparatus of claim 11, wherein the dummy prototype representation is an episode-known dummy prototype representation corresponding to an open set of unknown classes specific for the FSL inference episode.

21. A non-transitory computer-readable storage medium comprising instructions stored thereon which, when executed by at least one processor, causes the at least one processor to:
obtain a support set corresponding to a few shot learning (FSL) inference episode associated with a first machine learning network, wherein the support set includes a plurality of labeled support samples associated with one or more known classes of the support set;
determine a set of prototype representations based on the plurality of labeled support samples, wherein the set of prototype representations is determined in a learned embedding space of the first machine learning network, and wherein each prototype representation of the set of prototype representations corresponds to a respective known class of the one or more known classes;
generate, based on processing the set of prototype representations using a second machine learning network, a dummy prototype representation corresponding to a predicted dummy class for the FSL inference episode, wherein the second machine learning network generates the dummy prototype representation in the same learned embedding space used to determine the set of prototype representations;
determine one or more distance metrics for each query sample of one or more query samples corresponding to the FSL inference episode, wherein the one or more distance metrics are determined based on an augmented prototype set comprising the set of prototype representations and the dummy prototype representation; and
classify each query sample of the one or more query samples based on the one or more distance metrics between each query sample and the augmented prototype set, wherein each query sample is classified into one of the one or more known classes associated with the set of prototype representations or is classified into an open-set class associated with the dummy prototype representation, and wherein the open-set class is not included in the one or more known classes.

22. The non-transitory computer-readable storage medium of claim 21, wherein, to classify each query sample based on the one or more distance metrics, the instructions cause the at least one processor to:
determine a probability distribution over the one or more known classes and the open-set class, wherein the probability distribution is determined based at least in part on a Euclidean distance metric;
classify, based on the probability distribution, each query sample into one of the one or more known classes or into the open-set class; and
perform open-set rejection (OSR) based on a set of classified query samples classified into the open-set class associated with the dummy prototype representation.

23. The non-transitory computer-readable storage medium of claim 21, wherein the one or more known classes are keyword classes and the at least one processor is configured to determine each prototype representation using a plurality of support samples associated with a keyword class.

24. The non-transitory computer-readable storage medium of claim 23, wherein the instructions further cause the at least one processor to:
generate, using a neural network encoder of the first machine learning network, a plurality of embeddings for the plurality of support samples associated with the keyword class, the plurality of embeddings including an embedding for each support sample of the plurality of support samples; and
determine each prototype representation based on an average of the plurality of embeddings generated for the plurality of support samples.

25. The non-transitory computer-readable storage medium of claim 24, wherein the learned embedding space is a learned embedding space of the neural network encoder.

26. The non-transitory computer-readable storage medium of claim 23, wherein the keyword classes comprise a closed-set of known classes.

27. The non-transitory computer-readable storage medium of claim 21, wherein the second machine learning network is a dummy generator network, wherein:
the dummy generator network includes one or more linear layers and a maxpool layer;
the one or more linear layers receive as input the set of prototype representations; and
the maxpool layer receives as input an output of the one or more linear layers.

28. The non-transitory computer-readable storage medium of claim 27, wherein, to generate the dummy prototype representation, the instructions cause the at least one processor to:
generate, using the dummy generator network, a plurality of dummy prototypes; and
determine the dummy prototype representation by selecting one of the plurality of dummy prototypes based on a Gumbel softmax.

29. The non-transitory computer-readable storage medium of claim 21, wherein:
the one or more query samples include speech audio data; and
the plurality of labeled support samples includes speech audio data labeled with a corresponding one of the one or more known classes for each labeled support sample of the plurality of labeled support samples.

30. The non-transitory computer-readable storage medium of claim 21, wherein the dummy prototype representation is an episode-known dummy prototype representation corresponding to an open set of unknown classes specific for the FSL inference episode.

* * * * *